United States Patent [19]

Dickson

[11] 4,223,414
[45] Sep. 23, 1980

[54] COMBINED TRAILER AND BOAT COVER

[76] Inventor: Wilson M. Dickson, 115 S. Risk, P.O. Box 1204, Kilgore, Tex. 75662

[21] Appl. No.: 969,974

[22] Filed: Dec. 15, 1978

[51] Int. Cl.³ .............................................. B63B 17/02
[52] U.S. Cl. ....................................................... 9/1.5; 135/6
[58] Field of Search ...................... 9/1.1, 1.5, 1.2, 2 F; 135/6; 296/156, 157, 163

[56] References Cited

U.S. PATENT DOCUMENTS

| | | | |
|---|---|---|---|
| 3,107,369 | 10/1963 | Zijlstra | 9/1.1 |
| 3,831,208 | 8/1974 | Smith | 9/1.5 |

FOREIGN PATENT DOCUMENTS 699429  12/1965  Italy ............................................. 9/1.5

*Primary Examiner*—Trygve M. Blix
*Assistant Examiner*—Jesùs D. Sotelo
*Attorney, Agent, or Firm*—Clarence A. O'Brien; Harvey B. Jacobson

[57] ABSTRACT

A boat hull of the type including an upwardly opening interior bounded by generally horizontal deck surfaces is provided together with a cover structure for the boat of predetermined shape including downwardly facing marginal edges. Support structure is provided and supports the cover structure relative to the boat hull for shifting between a closed position with the downwardly facing marginal edges of the cover at least closely overlying the horizontal deck surfaces and closing the interior from above and an open position affording access to the interior of the boat hull from above. A first form of cover includes a forward portion pivotally supported from the bow stop of a trailer upon which the boat hull is supported with the cover oscillatable about a horizontal transverse axis. In a second form of the invention, the cover comprises a pair of opposite side cover sections supported from corresponding front and rear opposite side uprights of the associated trailer and the cover sections are mounted from the uprights for vertical shifting therealong and swinging relative thereto about horizontal longitudinal axes extending between the corresponding uprights. Finally, a third form of the invention includes a forward portion pivotally supported from the bow of the associated boat with the cover being angularly displaceable about a horizontal transverse axis relative to the boat and removable therefrom.

11 Claims, 9 Drawing Figures

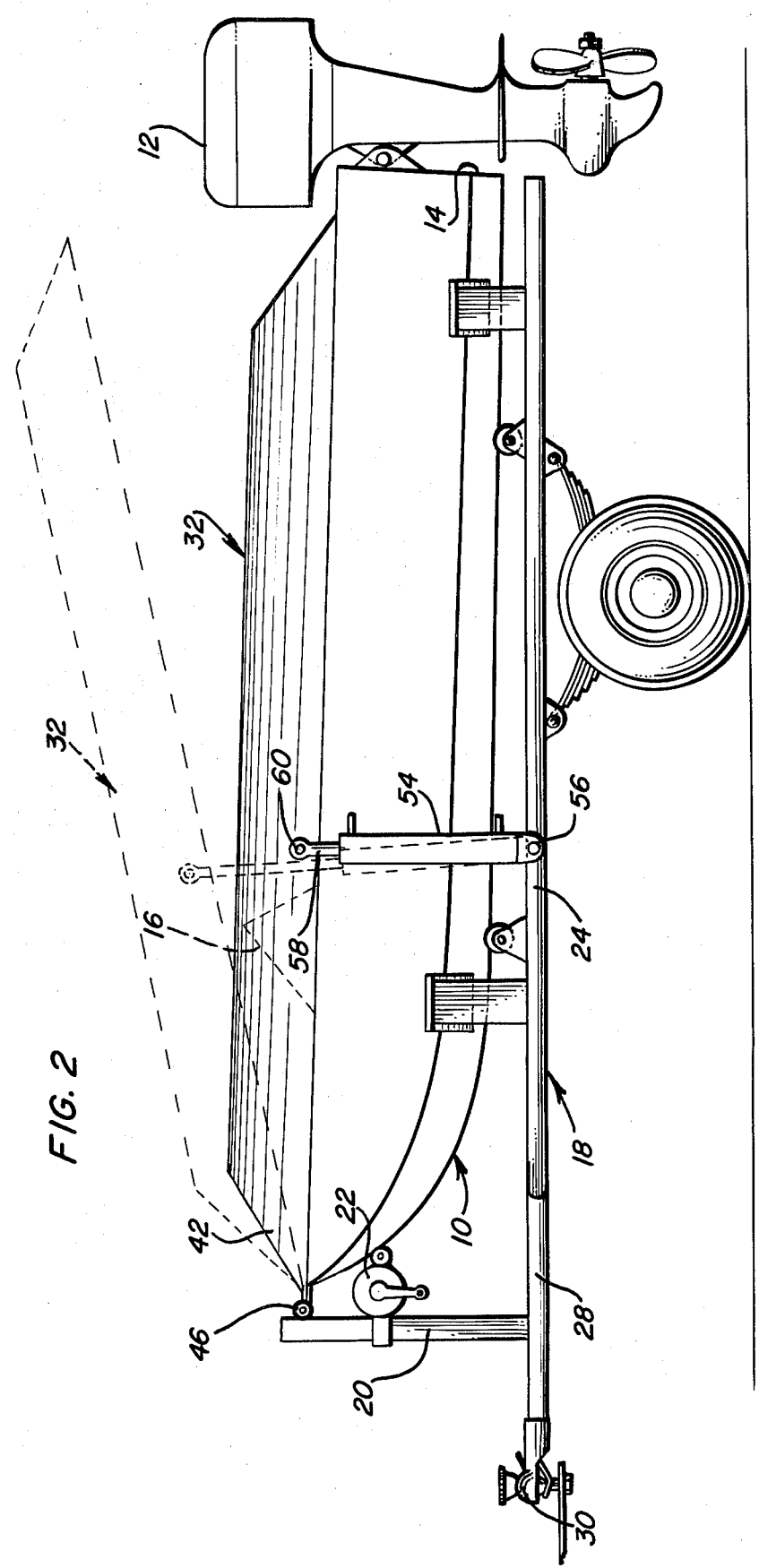
FIG. 2
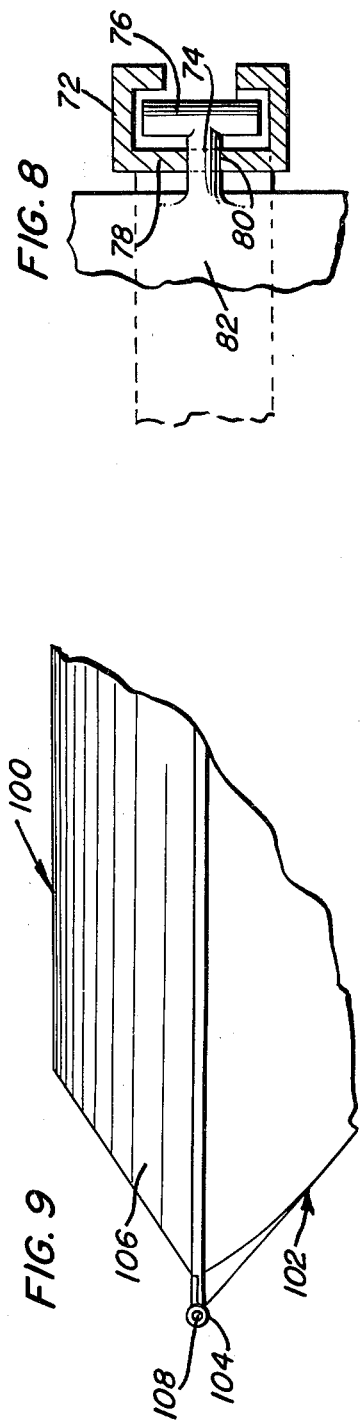
FIG. 8
FIG. 9

COMBINED TRAILER AND BOAT COVER

BACKGROUND OF THE INVENTION

The boating industry has been growing rapidly for numerous years and a major portion of the growth of the boat industry may be found in the small runabout type of boat. The small runabout type of boat may be powered by one or more outboard motors or by inboard propulsion and is, in many instances, towed to and from the water each time the boat is to be used. In addition, a reasonably large proportion of runabout type boats are moored when not in use while a small proportion of runabout boats are stored in multi-story storage areas provided in some marinas.

Those runabout boats which are towed to and from the water are for the most part stored outside in the owner's yard when not in use and boats which are moored when not in use are also exposed to the weather.

While various forms of covers, primarily flexible canvas and nylon covers are available for the protection of runabout boats stored outside, these covers require considerable maintenance, are time consuming to put in place and to remove when it is desired to utilize the boat normally covered thereby. In addition, flexible covers must be braced from beneath by bows in order to prevent water from collecting on the upper surfaces of the covers and flexible covers, even when braced from beneath by bows, are often not able to stand the weight of wet winter snows and ice. Accordingly, a need exists for structure in the form of at least a semi-rigid cover which may be readily moved into and out of position covering run-about type boats.

Various forms of semi-rigid covers and other means of covering at least portions of boats when they are not in use are disclosed in U.S. Pat. Nos. 1,658,500, 2,157,186, 2,664,577, 2,772,912, 3,116,949 and 3,348,874. However, these previously known forms of covers and other structures for covering at least portions of upwardly opening boat hulls are not readily adaptable for use in conjunction with the majority of small runabout boat type hulls which may be trailed or moored when not in use.

BRIEF DESCRIPTION OF THE INVENTION

The boat cover of the instant invention is in the form of at least a semi-rigid cover construction and is supported for shifting relative to an associated boat in a manner such that the cover structure may be readily shifted between its open and closed positions.

The main object of this invention is to provide a cover structure for an open runabout type of hull which may be readily used by persons who trail their boats to and from the water and also those persons who moor their boats between periods of use thereof.

Yet another object of this invention is to provide a boat cover structure which will not be subject to ready damage by hail or heavy snows and which will also not be subject to having pools of rain water collect thereon.

A further important object of this invention is to provide a boat cover structure which may be readily utilized in conjunction with an associated boat trailer.

A final object of this invention to be specifically enumerated herein is to provide a boat cover structure in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the assemblage illustrated in FIG. 1 and with an alternate open position of the boat cover illustrated in phantom lines;

FIG. 6 is an enlarged fragmentary transverse vertical sectional view taken substantially upon the plane indicated by the section line 6—6 of FIG. 3;

FIG. 7 is a fragmentary vertical sectional view similar to FIG. 6 but with the illustrated boat cover structure half swung to an open position;

FIG. 8 is an enlarged fragmentary horizontal sectional view taken substantially upon the plane indicated by the section line 8—8 of FIG. 6; and FIG. 9 is a fragmentary elevational view of the forward portion of a third form of boat cover constructed in accordance with the present invention as well as the forward of bow portion of the associated boat hull.

DETAILED DESCRIPTION OF THE INVENTION

Figure 1:
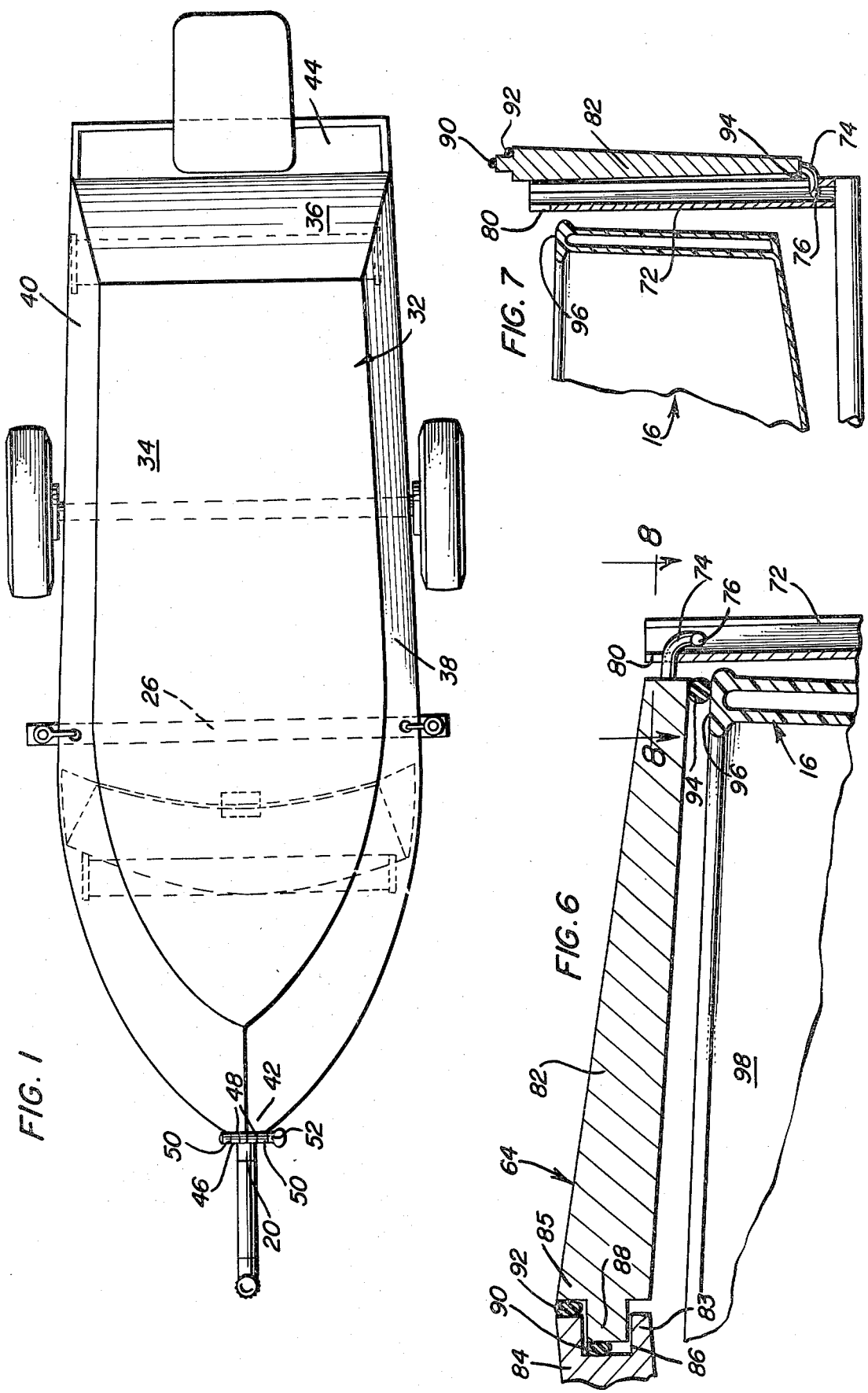
FIG. 1 is a top plan view of a first form of cover construction illustrated in operative association with a trailer supported runabout type of boat hull.

Referring now more specifically to the drawings, the numeral 10 generally designates a conventional form of open runabout hull having an outboard motor 12 mounted on its transom 14. The boat hull 10 includes a forward upwardly projecting windshield assembly 16 and is supported from a conventional form of boat trailer referred to in general by the reference numeral 18 including an upstanding forward bow stop 20 from which a winch 22 is supported.

The boat trailer 10 includes opposite side longitudinal members 24 suitably interconnected intermediate their opposite ends in any convenient manner including a horizontal transverse member 26 and the trailer 18 further includes a forwardly projecting tongue 28 carrying a trailer hitch coupling 30 at its forward end. Also, the lower end of the upstanding bow stop 20 is supported from the tongue 28.

A first form of cover structure in accordance with the present invention is referred to in general by the reference numeral 32 and defines a hollow downwardly opening substantially rigid cover of generally the same plan outline shape as the hull 10. The cover structure 32 includes a generally horizontal raised central portion 34, a rearwardly and downwardly inclined rear wall 36 and oppositely and downwardly outwardly inclined opposite sides 38 and 40. The rear wall 36 extends rearwardly and downwardly from the rear marginal portion of the central portion 34 and between the rearwardly and downwardly inclined rear marginal edges of the sides 38 and 40. The forward end portions of the sides 38 and 40 curve inwardly toward each other in order to form a forward portion and the lower marginal edges of the sides 38 and 40 and the rear wall 36 overlie generally horizontal upwardly facing deck surfaces 44 of the boat hull 10 bounding the upwardly opening interior of the hull 10. In addition, a hinge construction 46 is operatively connected between the forward portion 42 and the bow stop 20 and hingedly supports the cover structure 32 from the bow stop 20 for angular displacement of the cover structure 32 from the closed horizontal position illustrated in solid lines in FIG. 2 and the raised open phantom line position illustrated in FIG. 2. The hinge construction 46 includes a cover mounted hinge barrel portions 48 and bow stop mounted hinge barrel portions 50 aligned with opposite ends of the hinge barrel portion 48 and a removable hinge pin 52 extends through the barrel portions 48 and 50.

In addition, a pair of hydraulic cylinders 54 have their lower cylinder ends pivotally attached to the opposite side longitudinal frame members 24 as at 56 and their upper piston rod ends 58 pivotally anchored relative to the opposite side portions of the cover structure 32 as at 60. Any suitable source of hydraulic power, such as a hand hydraulic pump, may be utilized to actuate cylinders 54 in order to raise the cover structure 32 from the solid line position thereof illustrated in FIG. 2 to the phantom line position of FIG. 2. Once the cover structure 32 has been raised to the phantom line position thereof, the boat hull 10 may be shifted rearwardly relative to the trailer 18 and the cover 32 in order to displace the hull 10 outwardly from beneath the cover 32.

The lower marginal portions of the rear wall 36 and sides 38 and 40 at least closely overlie and may be sealed relative to the deck surfaces 44 of the boat hull 10 by any suitable form of compression seal structure (not shown) when the cover structure 32 is in the lowered position thereof.

Figure 5:
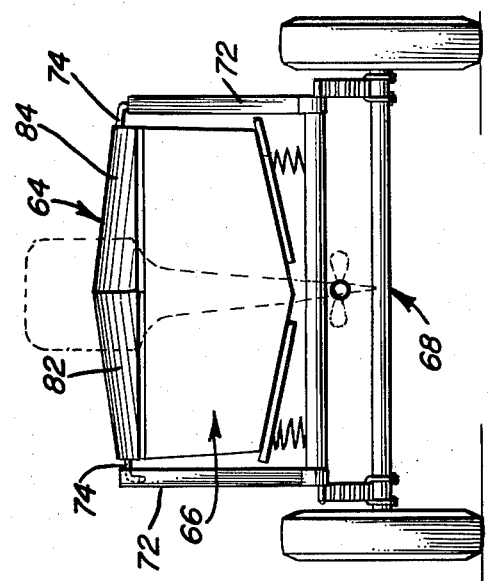
FIG. 5 is an enlarged rear elevational view of the assemblage illustrated in FIG. 3.
Figure 3:
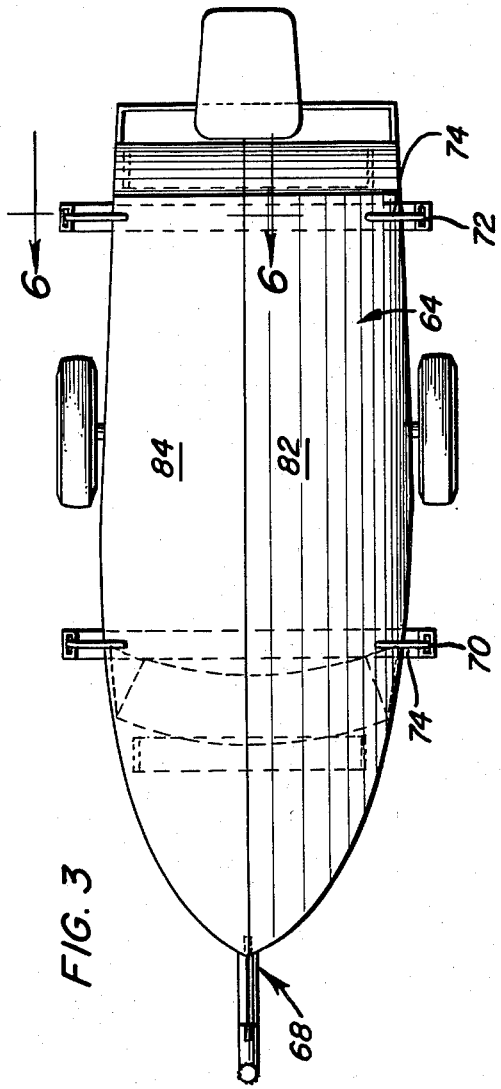
FIG. 3 is a top plan view of a second form of cover constructed in accordance with the present invention and operatively associated with a trailer upon which the corresponding boat rests.
Figure 4:
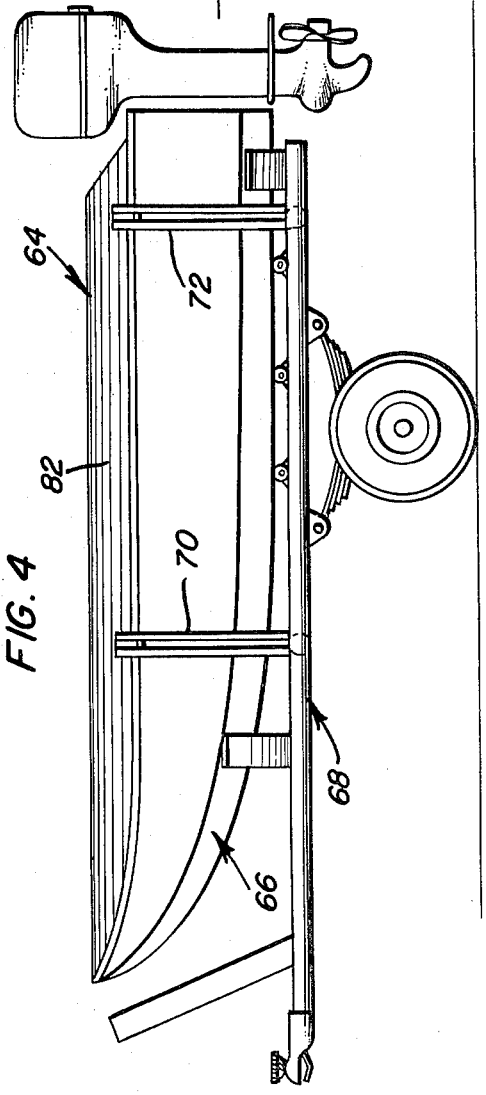
FIG. 4 is a side elevational view of the assemblage illustrated in FIG. 3.

With attention now invited more specifically to FIGS. 3 through 8 of the drawings, there will be seen a modified form of boat cover referred to in general by the reference numeral 64 operatively associated with a boat hull 66 mounted on a trailer 68. The trailer 68 includes pairs of front and rear opposite side channel members 70 and 72 supported therefrom slightly outwardly of the opposite sides of the boat hull 66 and the cover structure 64 includes a pair of half cover sections each including a pair of outwardly projecting support arms 74 provided with cross head followers 76 on their outer ends slidably engaged in the corresponding channel members 70 and 72, the upper end portions of the inner webs 78 of the channel members 70 and 72 being provided with upwardly opening slots 80 in which the support arms 74 are received when the cover sections are in their closed positions. A first of the cover sections is designated by the reference numeral 82 and the other cover section is designated by the reference numeral 84. The cover sections 82 and 84 include abutting marginal edge portions extending along the longitudinal center line of the boat hull 66 and one abutting edge portion 83 includes a longitudinal groove 86 formed therein while the other abutting edge portion 85 includes a longitudinal outwardly projecting tongue 88 received within the groove 86.

In order to insure a watertight seal between the abutting edge portions of the cover sections 82 and 84, an elongated compression seal 90 is seated within the groove 86 for engagement by the tongue 88 and an elongated compression seal 92 is carried by the section 82 immediately above the tongue 88 for engagement by the opposing marginal edge of the cover section 84. Further, elongated compression seals 94 may extend along the remaining marginal edge portions of the cover sections 82 in order to form a reasonably fluid-tight seal between the downwardly facing marginal edges of the cover sections 82 and 84 and the upwardly facing generally horizontal deck surfaces 96 corresponding to the deck surfaces 44 bounding the interior 98 of the boat hull 66.

When it is desired to swing the cover sections 82 and 84 to their open positions, one of the cover sections is first grasped and swung upwardly toward the corresponding outer side of the trailer 68. When the cover section has been swung to a vertical position, it will have automatically been displaced to the outer sides of the corresponding channel member 70 and 72 and may thereafter be lowered to the fully retracted positions thereof such as that illustrated in FIG. 7.

With attention now invited more specifically to FIG. 9 of the drawings, there will be seen a third form of cover structure referred to in general by the reference numeral 100. The cover structure 100 is substantially identical to the cover structure 32 and is operatively associated with a boat hull 102 corresponding to the boat hull 10. However, the hinge structure 104 corresponding to the hinge structure 46 is operatively connected between the forward portion 106 of the cover structure 100 and the bow of the boat hull 102. In addition, the hinge construction 104 includes a removable hinge pin 108. Thus, when it is desired to gain entrance to the interior of the boat hull 102, the cover structure 100 may be manually raised to an open position similar to the open position of the cover structure 32 illustrated in phantom lines in FIG. 2. Then, if it is desired to remove the cover structure 100, the hinge pin 108 may be removed.

It is deemed readily apparent that the various cover structures 32, 64 and 100 may be utilized in conjunction with boats that are trailed to and from the water. In addition, the cover structure 100 may be utilized in conjunction with a boat hull that is moored between periods of usage. If the cover structure 100 is utilized in conjunction with a boat which is moored between periods of usage, after the cover structure 100 has been removed, it may be inverted and moored in place in lieu of the boat hull 102 while the latter is in use.

Further, if it is desired, suitable latching structure (not shown) may be utilized to secure the cover sections 82 and 84 in the retracted positions thereof such as the retracted position of the cover structure 82 illustrated in FIG. 2 and the cover structure 32 may be utilized independent of the hydraulic cylinders 54 with merely a pair of opposite side props utilized to maintain the cover structure 32 in an open position such as that illustrated in phantom lines in FIG. 2.

In addition to the channel members 70 and 72 being utilized to support the cover sections 82 and 84 when they are in their retracted positions and also as partial supports for the cover sections 82 and 84 when they are in their closed operative positions, the channel members 70 and 72 may also function as guides for guiding the boat hull 66 into proper position on the trailer 68 when it is desired to retrieve the boat hull 66 from the water.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a boat hull of the type including an upwardly opening interior bounded by generally horizontal deck surfaces, predetermined shape cover structure for said boat, including downwardly facing marginal edges, support means supporting said cover structure relative to said boat hull for shifting between a closed position with said marginal edges at least closely overlying said deck surfaces and closing said interior from above and an open position affording access to said interior from above, said support means including a hull support structure from which said hull is stationarily supported, said cover structure being shiftable relative to said hull support structure and said hull during shifting between said closed and open positions.

2. The combination of claim 1 wherein said cover structure includes a pair of opposite side cover sections swingable about generally horizontal axes extending longitudinally of said hull during said swinging.

3. The combination of claim 2 wherein said hull support includes a boat trailer, said trailer including opposite side pairs of front and rear uprights between which said hull is snugly received, said opposite side cover sections being shiftably supported from said uprights.

4. The combination of claim 3 wherein said opposite side cover sections each including front and rear followers projecting outwardly therefrom and slidably and pivotally engaged with the corresponding uprights.

5. The combination of claim 4 wherein said uprights comprise tubular members defining longitudinal outer slots therein opening outwardly of the corresponding sides of said trailer, said followers being carried by outer end portions of front and rear support arms projecting outwardly from each of said cover sections.

6. The combination of claim 5 wherein the upper ends of said tubular members are open and define upwardly opening upper end inner slots opening inwardly of the corresponding sides of said trailer, said support arms being slidably receivable through outer and inner slots.

7. The combination of claim 3 wherein said cover sections include opposing adjacent longitudinal marginal edge portions extending generally along the longitudinal centerline of said hull.

8. The combination of claim 7 wherein said adjacent longitudinal edge portions comprise interfitted tongue and groove edge portions.

9. The combination of claim 8 including compression type seal means disposed between opposing surface portions of said tongue and groove edge portions.

10. The combination of claim 1 wherein said hull support structure comprises a boat trailer relative to which the boat hull may be longitudinally shifted forwardly and rearwardly, when the cover structure is in said open position, for loading and unloading said boat hull relative to said boat trailer.

11. The combination of claim 10 wherein said boat trailer and cover structure include forward portions, said support means including means defining a pivot connection between said forward portions for angular displacement of said cover structure relative to said trailer about a horizontal transverse axis.

* * * * *